H. W. CURTIS.
Cultivator.

No. 54,122.

Patented Apr. 24, 1866.

Witnesses:

Inventor:

UNITED STATES PATENT OFFICE.

H. W. CURTIS, OF WORCESTER, MASSACHUSETTS.

IMPROVEMENT IN CULTIVATORS.

Specification forming part of Letters Patent No. 54,122, dated April 24, 1866.

*To all whom it may concern:*

Be it known that I, H. W. CURTIS, of Worcester, in the county of Worcester and State of Massachusetts, have invented a new and Improved Cultivator; and I do hereby declare that the following is a full, clear, and exact description thereof, which will enable others skilled in the art to make and use the same, reference being had to the accompanying drawings, forming a part of this specification, in which—

Figure 1:
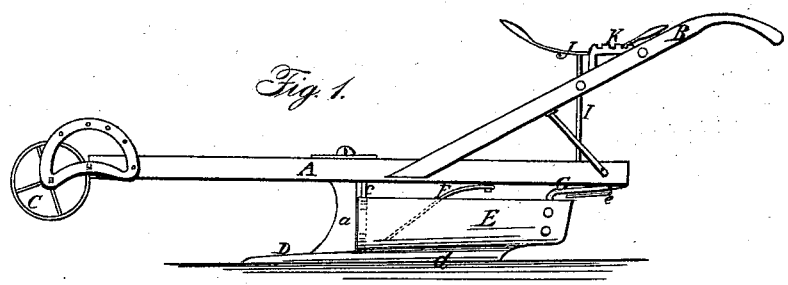
Figure 2:
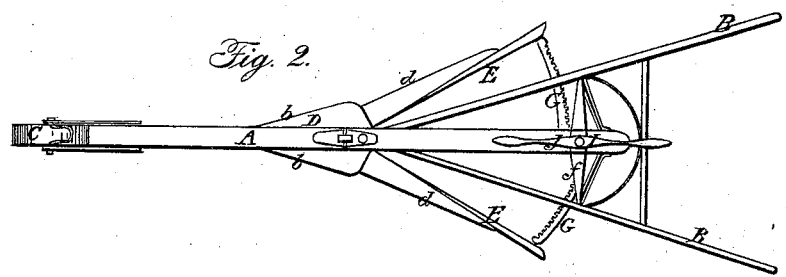
Figure 3:
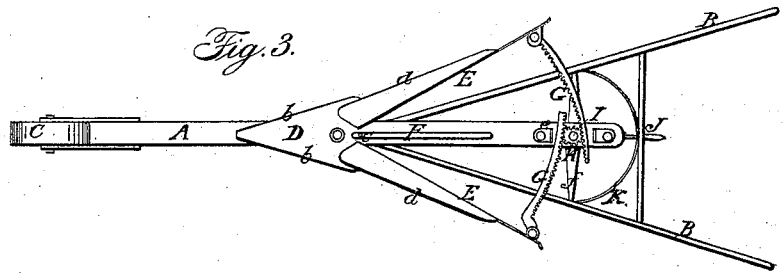

Figure 1 is a side view of my invention; Fig. 2, a plan or top view of the same; Fig. 3, an inverted plan of the same.

Similar letters of reference indicate like parts.

This invention consists in applying to a plow or share two wings, connected to the plow or share by means of joints, and having racks applied to them, into which racks a pinion gears, all being arranged in such a manner that the wings, at the will of the operator or driver, may be expanded or contracted to suit the width of the spaces between the rows of plants, or the width of the rows of themselves.

A represents the beam of the implement; B B, the handles; and C, a gage-wheel at the front of the beam. These parts may be constructed in the usual manner, and therefore do not require a minute description.

D represents a plow or share, the standard $a$ of which is secured to beam A in any proper manner. This plow is of pointed form, with double sides $b\,b$, and at the rear of the plow and standard there is a vertical post, $c$, the upper end of which is secured in the beam and the lower end fitted in the center of the rear end of the plow.

E E are two wings, the front ends of which are fitted by means of joints on the post $c$, and the lower edge of each wing has a lateral projecting flange, $d$, to serve as a cutting-edge, and they are in fact continuations of the plow or share D.

The plow or share D is braced at its rear from the beam A by a rod, F, and to the rear part of each wing E there is attached a segment-rack, G, said racks extending horizontally toward the beam A, and toothed at their edges, which face each other, as shown clearly in Figs. 2 and 3. These racks work through a guide, $e$, at the under side of the beam, and a pinion, H, gears into both racks, said pinion being at the lower end of a vertical rod, I, which passes up through the beam and a cross-bar, $f$, of the handles, and has a handle, J, on its upper end, either end of which catches into a semicircular rack, K, attached to the handles.

From the above description it will be seen that by turning the handle J and rod I the pinion H will operate the racks G and move the wings E simultaneously toward and from each other, expanding or contracting them to suit the width of the spaces between the rows, the wings being retained at any desired point in consequence of the handle J catching into the semicircular rack K.

This implement may be used for eradicating weeds or for plowing out potatoes. The wings may be moved or adjusted at any time, even when the device is in motion, if necessary, and hence crops may be cultivated thoroughly, for the inequalities in the width of the spaces between the rows may be compensated for by the adjustment of the wings, and all the weeds taken out.

Having thus described my invention, what I claim as new, and desire to secure by Letters Patent, is—

The wings E E, connected at the rear of the plow or share D by means of joints, in combination with the segment-racks G G, and the pinion H, for adjusting the wings E E, all arranged to operate in the manner substantially as and for the purpose herein set forth.

HARRISON W. CURTIS.

Witnesses:
 MILTON W. CLARK,
 CHARLES H. SMITH.